United States Patent
Endo et al.

(10) Patent No.: US 12,221,518 B2
(45) Date of Patent: *Feb. 11, 2025

(54) BIAXIALLY STRETCHED POLYAMIDE FILM AND LAMINATE FILM

(71) Applicant: TOYOBO CO., LTD., Osaka (JP)

(72) Inventors: Takuro Endo, Inuyama (JP); Kosuke Hama, Inuyama (JP); Takamichi Goto, Inuyama (JP); Shigetomo Yamamoto, Osaka (JP)

(73) Assignee: TOYOBO CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/431,312

(22) PCT Filed: Jan. 24, 2020

(86) PCT No.: PCT/JP2020/002534
§ 371 (c)(1),
(2) Date: Aug. 16, 2021

(87) PCT Pub. No.: WO2020/170714
PCT Pub. Date: Aug. 27, 2020

(65) Prior Publication Data
US 2022/0135752 A1    May 5, 2022

(30) Foreign Application Priority Data

Feb. 18, 2019    (JP) .................................. 2019-026446
Feb. 18, 2019    (JP) .................................. 2019-026447
(Continued)

(51) Int. Cl.
*B32B 1/00*    (2024.01)
*B32B 27/08*    (2006.01)
(Continued)

(52) U.S. Cl.
CPC ................................. *C08J 5/18* (2013.01); *B32B 1/00* (2013.01); *B32B 27/08* (2013.01); *B32B 27/34* (2013.01);
(Continued)

(58) Field of Classification Search
CPC .... C08L 2205/02; C08L 77/02; C08L 67/025; B32B 2270/00
See application file for complete search history.

(56) References Cited

U.S. PATENT DOCUMENTS 4,120,928 A * 10/1978 Furukawa ............... B29C 48/08
264/290.2
5,612,105 A *  3/1997 Okamoto ............... B29C 55/12
428/458
(Continued)

FOREIGN PATENT DOCUMENTS

CN    102947391 A    2/2013
CN    106280431 A    1/2017
(Continued)

OTHER PUBLICATIONS

Herzog, B. et al., "Polyamides", Ullmann's Encyclopedia of Industrial Chemistry, Wily-VCH Verlag, Weinheim, 2013 (Year: 2013).*
(Continued)

*Primary Examiner* — Michael C Miggins
(74) *Attorney, Agent, or Firm* — Leydig, Voit & Mayer, Ltd.

(57) ABSTRACT

The objective of the present invention is to provide a biaxially stretched polyamide film that is excellent in an impact resistance, a folding pinhole resistance and a friction pinhole resistance and that is produced from a raw material derived from a biomass. The present invention relates to a biaxially stretched polyamide film, comprising 99 to 70 mass % of a Polyamide 6 resin and 1 to 30 mass % of a polyamide resin, wherein at least a part of a raw material of
(Continued)

the polyamide resin is derived from a biomass, and the biaxially stretched polyamide film meets the following (a) and (b): (a) the number of Gelbo pinhole defect is 10 or less after the biaxially stretched polyamide film is twisted and bent 1000 times at 1° C. using a Gelbo flex tester, (b) a distance leading to a pinhole formation by a friction resistance pinhole test is 2900 cm or more.

8 Claims, 1 Drawing Sheet

(30) Foreign Application Priority Data

Oct. 17, 2019 (JP) .................................. 2019-190107
Oct. 17, 2019 (JP) .................................. 2019-190108

(51) Int. Cl.
*B32B 27/34* (2006.01)
*B65D 65/40* (2006.01)
*C08J 5/18* (2006.01)
*C08L 77/02* (2006.01)

(52) U.S. Cl.
CPC .............. *B65D 65/40* (2013.01); *C08L 77/02* (2013.01); *B32B 2270/00* (2013.01); *B32B 2307/518* (2013.01); *B32B 2439/46* (2013.01); *C08J 2377/02* (2013.01); *C08J 2377/06* (2013.01); *C08J 2477/08* (2013.01); *C08L 2205/02* (2013.01)

(56) References Cited

U.S. PATENT DOCUMENTS

| | | | |
|---|---|---|---|
| 5,939,205 A | 8/1999 | Yokoyama et al. | |
| 6,294,263 B1 | 9/2001 | Okudaira et al. | |
| 6,376,093 B1* | 4/2002 | Fujita | C08J 5/18 428/847.1 |
| 9,376,563 B2 | 6/2016 | Dullaert et al. | |
| 2002/0018905 A1* | 2/2002 | Okudaira | B32B 27/34 428/474.9 |
| 2006/0088678 A1 | 4/2006 | Berrier et al. | |
| 2009/0269532 A1 | 10/2009 | Ferreiro et al. | |
| 2010/0242801 A1 | 9/2010 | Lortz et al. | |
| 2011/0072967 A1 | 3/2011 | Wood et al. | |
| 2013/0244047 A1 | 9/2013 | Stroeks et al. | |
| 2013/0323485 A1* | 12/2013 | Shimizu | C08L 77/06 428/212 |
| 2014/0030510 A1 | 1/2014 | Kimura et al. | |
| 2015/0126349 A1 | 5/2015 | Ishihara et al. | |
| 2016/0002419 A1 | 1/2016 | Miyaguchi | |
| 2018/0265658 A1 | 9/2018 | Miyaguchi | |
| 2022/0259431 A1 | 8/2022 | Endo et al. | |
| 2022/0339921 A1 | 10/2022 | Goto et al. | |

FOREIGN PATENT DOCUMENTS

| | | | |
|---|---|---|---|
| CN | 109825076 A | 5/2019 | |
| EP | 2975079 A1 | 1/2016 | |
| EP | 4023430 A1 | 7/2022 | |
| EP | 4043214 A1 | 8/2022 | |
| JP | H08-047972 A | 2/1996 | |
| JP | H10-029264 A | 2/1998 | |
| JP | H10-287753 A | 10/1998 | |
| JP | H11-254615 A | 9/1999 | |
| JP | 2001-205761 A | 7/2001 | |
| JP | 2003-181972 A | 7/2003 | |
| JP | 2004-098584 A | 4/2004 | |
| JP | 2004-252401 A | 9/2004 | |
| JP | 2004-255775 A | 9/2004 | |
| JP | 2006-282950 A | 10/2006 | |
| JP | 2007-055159 A | 3/2007 | |
| JP | 2009-119639 A | 6/2009 | |
| JP | 2012-097163 A | 5/2012 | |
| JP | 2017-002114 A | 1/2017 | |
| JP | 2019-064075 A | 4/2019 | |
| KR | 10-2015-0065080 A | 6/2015 | |
| TW | 201615404 A | 5/2016 | |
| WO | WO 2000/002031 A | 4/2000 | |
| WO | WO 2012/117884 A1 | 9/2012 | |
| WO | WO 2017/209268 A1 | 12/2017 | |

OTHER PUBLICATIONS

Campus Plastics, Rilsan BMNO PA 11 Datasheet https://www.campusplastics.com/campus/en/datasheet/Rilsan%C2%AE+BMNO/ARKEMA/179/44c2535a (Year: 2021).*
Japanese Patent Office, International Search Report in International Patent Application No. PCT/JP2020/002534 (Mar. 24, 2020).
Intellectual Property India, Examination Report in Indian Patent Application No. 202147041851 (Sep. 15, 2022).
China National Intellectual Property Administration, Office Action in Chinese Patent Application No. 202080015003.6 (Nov. 2, 2022).
European Patent Office, Extended European Search Report in European Patent Application No. 20760133.7 (Nov. 7, 2022).
China National Intellectual Property Administration, Office Action in Chinese Patent Application No. 202080015003.6 (Apr. 13, 2023).
Japanese Patent Office, International Search Report in International Patent Application No. PCT/JP2020/029126 (Oct. 6, 2020).
Japan Patent Office, Office Action in Japanese Patent Application No. 2020-519452 (Sep. 12, 2023).
Taiwan Intellectual Property Office, First Office Action in Taiwanese Patent Application No. 109102938 (Sep. 20, 2023).
European Patent Office, Extended European Search Report in European Patent Application No. 20856542.4 (Aug. 21, 2023).
Taiwan Intellectual Property Office, First Office Action in Taiwanese Patent Application No. 109125555 (Sep. 8, 2023).
Barth, "Biaxially Stretched Polyamide Film" (Chapter 11) in "Biaxial Stretching of Film: Principles and Applications" (edited by Mark T. DeMeuse, and published by Woodhead Publishing Limited), pp. 125-140 (2011).
China National Intellectual Property Administration, Third Office Action in Chinese Patent Application No. 202080015003.6 (Jul. 7, 2023).
China National Intellectual Property Administration, Rejection Decision in Chinese Patent Application No. 202080015003.6 (Nov. 10, 2023).
Japan Patent Office, Notification of Written Submission of Publications in Japanese Patent Application No. 2020-519452 (Jan. 12, 2024).
Taiwan Intellectual Property Office, Second Office Action in Taiwanese Patent Application No. 109102938 (Jan. 18, 2024).
Indonesian Directorate General of Intellectual Property, Office Action in Indonesian Patent Application No. P00202107585 (Mar. 20, 2024).
China National Intellectual Property Administration, Reexamination Notification in Chinese Patent Application No. 202080015003.6 (Aug. 5, 2024).
Korean Intellectual Property Office, Office Action in Korean Patent Application No. 10-2021-7029138 (Jul. 10, 2024).
China National Intellectual Property Administration, Reexamination Notification in Chinese Patent Application No. 202080015003.6 (Sep. 26, 2024).
Japan Patent Office, Office Action in Japanese Patent Application No. 2020-562783 (Aug. 30, 2024).
U.S. Appl. No. 17/631,227, filed Jan. 28, 2022.

* cited by examiner

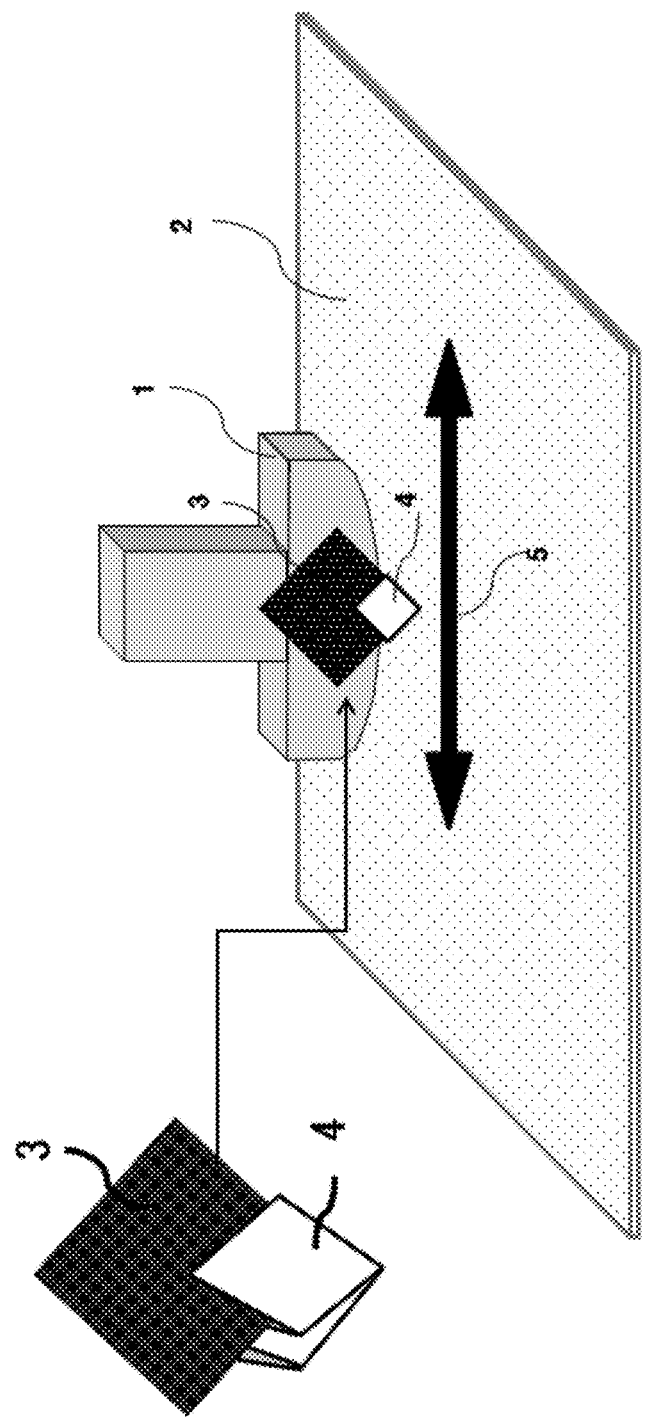

BIAXIALLY STRETCHED POLYAMIDE FILM AND LAMINATE FILM

TECHNICAL FIELD

The present invention relates to a biaxially stretched polyamide film that is excellent in an impact resistance, a folding pinhole resistance and a friction pinhole resistance and that is produced from a raw material derived from a biomass. A biomass means an organic resource derived from an organism such as a plant. The biaxially stretched polyamide film of the present invention is preferably used as a film for packaging a food.

BACKGROUND ART

A biaxially stretched film composed of an aliphatic polyamide such as Polyamide 6 is excellent in an impact resistance and a folding pinhole resistance and has been widely used as various films for a packaging material since early times.

In addition, a biaxially stretched polyamide film that is softer and that has an improved folding pinhole resistance is widely used. Such a biaxially stretched polyamide film is prepared by mixing various elastomers, i.e. gum ingredient, into an aliphatic polyamide in order to further improve a folding pinhole resistance and an impact resistance for filling and packaging a liquid such as a seasoning.

A film containing a polyamide elastomer to improve the above-described folding pinhole resistance is known (please see, for example, Patent document 1). A folding pinhole resistance and an impact resistance of the film under a low temperature circumstances are good, and a pinhole due to a folding fatigue is hardly generated even under a low temperature circumstances.

A pinhole is generated due to a friction other than a folding. Methods for reducing pinholes generated by a folding and a friction are conflicted in many cases. For example, a folding pinhole becomes less likely to occur by increasing a flexibility of a film; on the one hand, a pinhole due to a friction tends to be likely to occur due to an increase of a flexibility. A laminate product for packaging excellent in a folding resistance and a friction pinhole resistance by applying a surface coating agent on the outer surface of a biaxially stretched polyamide film is proposed (please see, for example, patent document 2). A friction pinhole, however, cannot be sufficiently prevented by such a method. In addition, the method requires a coating step.

Furthermore, a degraded material called as a die build-up is easily formed at a lip of a die in the case of a film prepared by mixing a polyamide elastomer in an aliphatic polyamide, since the polyamide elastomer added during the production of the film is deteriorated by heat. It was found that such a depleted material decreases the accuracy of the thickness of a film. In addition, the depleted material has a problem that the depleted material drops to cause a defective product and decreases an efficiency of a continuous production of a film.

A use of a biomass has recently attracted attention in place of a raw material from fossil fuel for a creation of a recycling society in the material field. A biomass is an organic compound photosynthesized from carbon dioxide and water, and is a so-called carbon-neutral material. A used biomass becomes carbon dioxide and water again. The carbon-neutral material can inhibit an increase of carbon dioxide as a greenhouse gas, since an emission amount and an absorption amount of carbon dioxide are the same as each other. A biomass plastic produced from such a biomass as a raw material is rapidly put into practical application in these latter days. A polyester as a general-purpose polymer material is tried to be produced from a biomass raw material.

For example, Patent document 3 discloses a resin composition and a film characterized in containing 50 to 95 mass % of a polyester composed of a diol unit and a dicarboxylate unit to the total resin composition in the polyester film field, wherein the diol unit is ethylene glycol derived from a biomass and the dicarboxylate unit is a dicarboxylate derived from petroleum.

The mechanical property of the polyester of the prior art is similar to that of the case of the conventional ethylene glycol derived from a fossil fuel, even if the polyester is produced by using the ethylene glycol derived from a biomass in place of the conventional ethylene glycol derived from a fossil fuel.

A carbon-neutral material produced from a raw material derived from a biomass is required in the field of a polyamide film under the above-descried circumstances.

PRIOR ART DOCUMENT

Patent Document

Patent document 1: JP H11-254615 A
Patent document 2: JP 2001-205761 A
Patent document 3: JP 2012-097163 A

DISCLOSURE OF THE INVENTION

Problems to be Solved by the Invention

The present invention is completed to solve the above problems of the prior arts. The objective of the present invention is to provide a biaxially stretched polyamide film that is excellent in an impact resistance, a folding pinhole resistance and a friction pinhole resistance and that is produced from a raw material derived from a biomass.

Means for Solving the Problems

The present invention is described as follows.
[1] A biaxially stretched polyamide film,
comprising 99 to 70 mass % of a Polyamide 6 resin and 1 to 30 mass % of a polyamide resin,
wherein at least a part of a raw material of the polyamide resin is derived from a biomass.
[2] A biaxially stretched polyamide film,
comprising A layer: a base material layer and B layer: a surface layer,
wherein the B layer is laminated on at least one surface of the A layer,
the A layer comprises 99 to 70 mass % of a Polyamide 6 resin and 1 to 30 mass % of a polyamide resin,
at least a part of a raw material of the polyamide resin is derived from a biomass, and
the B layer comprises 70 mass % or more of a Polyamide 6 resin.
[3] The biaxially stretched polyamide film according to the above [1] or [2], wherein a content amount of a carbon derived from the biomass to a total carbon in the biaxially stretched polyamide film, measured by a radiocarbon ($C^{14}$) measurement, is 1 to 15%.
[4] The biaxially stretched polyamide film according to any one of the above [1] to [3], wherein the polyamide resin wherein at least a part of the raw material of the polyamide resin is derived from the biomass is at least one of a polyamide resin selected from the group consisting of Polyamide 11, Polyamide 410, Polyamide 610 and Polyamide 1010.

[5] The biaxially stretched polyamide film according to any one of the above [1] to [4], wherein the biaxially stretched polyamide film meets the following (a) and (b):
(a) the number of Gelbo pinhole defect is 10 or less after the biaxially stretched polyamide film is twisted and bent 1000 times at 1° C. using a Gelbo flex tester,
(b) a distance leading to a pinhole formation by a friction pinhole resistance test is 2900 cm or more.

[6] The biaxially stretched polyamide film according to any one of the above [1] to [5], wherein Haze is 10% or less and a kinetic friction coefficient is 1.0 or less.

[7] The biaxially stretched polyamide film according to any one of the above [1] to [6], wherein a laminate strength after the biaxially stretched polyamide film is laminated with a polyethylene sealant film is 4.0 N/15 mm or more.

[8] A laminate film, wherein a sealant film is laminated on the biaxially stretched polyamide film according to any one of the above [1] to [7].

[9] A packaging bag comprising the laminate film according to the above [8].

Effect of the Invention

The biaxially stretched polyamide film of the present invention contains Polyamide 6 as a main component and is produced by blending a polyamide resin polymerized from the specific raw material derived from a biomass in the specific film forming condition. As a result, an impact resistance, a folding pinhole resistance, a friction pinhole resistance and an adhesion property with a sealant film are expressed and a carbon neutral polyamide film is obtained.

In addition, an adhesion of a depleted material on an inside of a die and an adhesion of a die build-up at a lip of a die slip can be inhibited for a long time and thereby a deterioration of a film thickness uniformity can be inhibited by the present invention, since a polyamide elastomer is not deteriorated inside of a die unlike in the case where a polyamide elastomer is added to improve a folding pinhole resistance in the prior art.

Furthermore, when a depleted material is adhered on an inside surface of a die and a die slip entrance, it is needed to stop the production and clean a die lip in order to inhibit a deterioration of a film thickness. The biaxially stretched polyamide film of the present invention can be continuously produced for a long time.

BRIEF DESCRIPTION OF THE DRAWINGS

FIG. 1 is a schematic view of a friction pinhole resistance evaluation apparatus.

EXPLANATION OF REFERENCES

1: Head part of fastness test machine
2: Cardboard
3: Mat board for holding sample
4: Film sample folded into quarters
5: Amplitude direction of rub

MODE FOR CARRYING OUT THE INVENTION

Hereinafter, the biaxially stretched polyamide film of the present invention is described in detail.

The present invention relates to a biaxially stretched polyamide film of the present invention comprising 99 to 70 mass % of a Polyamide 6 resin and 1 to 30 mass % of a polyamide resin, wherein at least a part of a raw material of the polyamide resin is derived from a biomass, or a biaxially stretched polyamide film constituted by laminating B layer: surface layer on at least one surface of A layer: base material layer, wherein the base material layer consists of 99 to 70 mass % of a Polyamide 6 resin and 1 to 30 mass % of a polyamide resin, and at least a part of a raw material of the polyamide resin is derived from a biomass.

Biaxially stretched polyamide film or A layer: base material layer

The biaxially stretched polyamide film or the base material layer (A layer) of the present invention contains 70 mass % or more of a Polyamide 6 resin; as a result, an excellent mechanical strength such as an impact strength and a gas barrier property against oxygen or the like, which are inherent properties of a biaxially stretched polyamide film composed of a Polyamide 6 resin, can be expressed.

The biaxially stretched polyamide film or the base material layer (A layer) of the present invention contains 1 to 30 mass % of a polyamide resin, wherein at least a part of a raw material of the polyamide resin is derived from a biomass; as a result, a folding pinhole resistance is improved. In the case of a polyamide elastomer and a polyolefin elastomer conventionally used as a folding pinhole resistance improvement agent, a folding pinhole resistance is improved but a friction pinhole resistance becomes worse. A biaxially stretched polyamide film excellent in both of a folding pinhole resistance and a friction pinhole resistance can be produced by containing 1 to 30 mass % of a polyamide resin, wherein at least a part of a raw material of the polyamide resin is derived from a biomass. In addition, a carbon neutral film having few effect on an increase and decrease of carbon dioxide on earth can be produced.

Polyamide 6 Resin

The Polyamide 6 resin usable in the present invention is generally produced by ring-opening polymerization of ε-caprolactam. In general, the Polyamide 6 resin produced by ring-opening polymerization is generally dried and then melted and extruded from an extruder after a lactam monomer is removed using hot water.

A relative viscosity of the Polyamide 6 resin is preferably 1.8 to 4.5 and more preferably 2.6 to 3.2. When the relative viscosity is less than 1.8, an impact strength of the film may be insufficient. When the relative viscosity is more than 4.5, a load on an extruder may become large and it may become difficult to produce an unstretched film before stretching.

Polyamide resin of which a part of raw material is derived from biomass

An example of the polyamide resin of which a part of the raw material is derived from a biomass includes Polyamide 11, Polyamide 410, Polyamide 610, Polyamide 1010, polyamide MXD10 resin and Polyamide 11·6T copolymer resin.

Polyamide 11 is a polyamide resin having a structure composed by binding monomers having a carbon number of 11 through amide bonds. In general, Polyamide 11 is produced using aminoundecanoic acid or undecane lactam as a monomer. Aminoundecanoic acid is particularly preferred from the viewpoint of carbon neutrality, since aminoundecanoic acid is a monomer obtained from castor oil. A ratio of a constituent unit derived from a monomer having a carbon number of 11 to a total constituent units in Polyamide 11 is preferably 50% or more, more preferably 80% or more and may be 100%.

The Polyamide 11 is generally produced by polymerizing the above-described aminoundecanoic acid. The Polyamide 11 produced by polymerization is dried and then melted and extruded from an extruder after a lactam monomer is removed using hot water in some cases.

A relative viscosity of Polyamide 11 is preferably 1.8 to 4.5 and more preferably 2.4 to 3.2. When the relative viscosity is less than 1.8, an impact strength of a film may be insufficient. When the relative viscosity is more than 4.5, a load on an extruder may become large and it may become difficult to produce an unstretched film before stretching.

The Polyamide 610 is a polyamide resin having a structure prepared by polymerizing a diamine having a carbon number of 6 and a dicarboxylic acid having a carbon number of 10. In general, hexamethylenediamine and sebacic acid are used. Sebacic acid is preferred from the viewpoint of carbon neutrality, since sebacic acid is a monomer obtained from castor oil. A total ratio of a constituent unit derived from a monomer having a carbon number of 6 and a constituent unit derived from a monomer having a carbon number of 10 to a total constituent units in PA610 is preferably 50% or more, more preferably 80% or more and may be 100%.

The Polyamide 1010 is a polyamide resin having a structure prepared by polymerizing a diamine having a carbon number of 10 and a dicarboxylic acid having a carbon number of 10. In general, 1,10-decanediamine (decamethylenediamine) and sebacic acid are used for Polyamide 1010. Decamethylenediamine and sebacic acid are preferred from the viewpoint of carbon neutrality, since decamethylenediamine and sebacic acid are monomers obtained from castor oil. A total ratio of a constituent unit derived from a diamine having a carbon number of 10 and a constituent unit derived from a dicarboxylic acid having a carbon number of 10 to a total constituent units in PA1010 is preferably 50% or more, more preferably 80% or more and may be 100%.

The Polyamide 410 is a polyamide resin having a structure prepared by copolymerizing a monomer having a carbon number of 4 and a diamine having a carbon number of 10. In general, sebacic acid and tetramethylenediamine are used for Polyamide 410. Sebacic acid is preferably produced from castor oil as a raw material with respect to an environment aspect. Sebacic acid to be used in the present invention is preferably produced from castor oil from the view point of an environmental protection, particularly from the view point of carbon neutrality.

A upper limit of a content amount of the polyamide resin of which at least a part of a raw material is a biomass in the biaxially stretched polyamide film or the base material layer (A layer) of the present invention is 30 mass % and preferably 20 mass %. When the content amount of the polyamide resin of which at least a part of a raw material is a biomass is more than 30 mass %, it becomes difficult to produce a homogeneous unstretched film, since a melted film becomes unstable during casting.

Auxiliary Material and Additive

The biaxially stretched polyamide film or the base material layer (A layer) of the present invention may contain various additives such as other thermoplastic resin, lubricant, heat stabilizer, antioxidant, antistatic agent, antifog additive, ultraviolet absorber, dye and pigment as needed.

Other Thermoplastic Resin

The biaxially stretched polyamide film or the base material layer (A layer) of the present invention may contain a thermoplastic resin other than the above-described Polyamide 6 and the polyamide of which at least a part of a raw material is derived from a biomass to the extent that the objective of the present invention is not damaged. An example of the other thermoplastic resin includes a polyamide resin such as Polyamide 12 resin, Polyamide 66 resin, Polyamide 6·12 copolymer resin, Polyamide 6·66 copolymer resin and Polyamide MXD6 resin.

Other thermoplastic resin other than a polyamide, such as a polyester polymer and a polyolefin polymer, may be contained as needed. An example of the polyester polymer includes polyethylene terephthalate, polybutylene telephthalate and polyethylene-2,6-naphthalate. An example of the polyolefin polymer includes polyethylene and polypropylene.

The raw material of the thermoplastic resin is preferably derived from a biomass, since an increase and decrease of carbon dioxide on earth is not affected and thereby an environmental load can be reduced.

Lubricant

The biaxially stretched polyamide film or the base material layer (A layer) of the present invention preferably contains a fine particle and an organic lubricant, such as fatty acid amide, as a lubricant in order to improve lubrication and facilitate handling.

The biaxially stretched polyamide of the present invention excellent in lubrication property has an effect to reduce a packaging bag tear due to friction.

The above-described fine particle may be appropriately selected to be used from an inorganic fine particle and a polymer organic fine particle. An example of the inorganic fine particle includes silica, kaolin and zeolite, and an example of the polymer organic fine particle includes acrylate and polystyrene. A silica fine particle is preferably used with respect to a transparency and lubrication property.

A preferred average particle diameter of the above-described fine particle is 0.5 to 5.0 μm and more preferably 1.0 to 3.0 μm. When the average particle diameter is less than 0.5 μm, a large additive amount is required for a good lubrication property. On the one hand, when the average particle diameter is more than 5.0 μm, an appearance tends to become worse due to an excessive large surface roughness of a film.

When the above-described silica fine particle is used, a pore volume of the silica is preferably 0.5 to 2.0 ml/g and more preferably 0.8 to 1.6 ml/g. When the pore volume is less than 0.5 ml/g, a void may be easily formed and a transparency of a film may become worse. When the pore volume is more than 2.0 ml/g, a surface protrusion due to a fine particle tends to be difficult to be formed.

The biaxially stretched polyamide film or the base material layer (A layer) of the present invention may contain a fatty acid amide and/or a fatty acid bisamide to improve a lubrication property. An example of the fatty acid amide and/or fatty acid bisamide includes erucamide, stearamide, ethylene bis(stearamide), ethylene bis(behenic acid amide) and ethylene bis(oleic amide).

A content amount of the fatty acid amide and/or fatty acid bisamide in the biaxially stretched polyamide film of the present invention is preferably 0.01 to 0.40 mass % and more preferably 0.05 to 0.30 mass %. When the content amount of the fatty acid amide and/or fatty acid bisamide is less than the above-described range, a lubrication property tends to become worse. On the one hand, the content amount is more than the above-described range, a wettability tends to become worse.

The biaxially stretched polyamide film or the base material layer (A layer) of the present invention may contain a polyamide resin such as a Polyamide MXD6 resin, a Polyamide 12 resin, a Polyamide 66 resin, a Polyamide 6.12 copolymer resin and a Polyamide 6·66 copolymer resin in order to improve a lubrication property. A Polyamide MXD6 resin is particularly preferred, and 1 to 10 mass % is preferably added.

Antioxidant

The biaxially stretched polyamide film or the base material layer (A layer) of the present invention may contain an antioxidant.

An antioxidant is preferably a phenol antioxidant. The phenol antioxidant is preferably a totally hindered phenolic antioxidant or a partially hindered phenolic antioxidant. An example of the antioxidant includes tetrakis-[methylene-3-(3',5'-di-t-butyl-4'-hydroxyphenyl)propionate]methane, stearyl-β-(3,5-di-t-butyl-4-hydroxyphenyl)propionate and 3,9-bis[1,1-dimethyl-2-[β-(3-t-butyl-4-hydroxy-5-methylphenyl)propionyloxy]ethyl]2,4,8,10-tetraoxaspiro[5,5]undecane.

When the above-described phenol antioxidant is contained, a film production operability of the biaxially stretched polyamide film may be improved. In particular, when a recycled film is used as a raw material, a resin is easily deteriorated due to heat and thereby a film production operability tends to become worse to increase a production cost. On the one hand, when an antioxidant is contained, a deterioration of a resin by heat is inhibited and a film production operability is improved.

B Layer: Surface Layer

The surface layer (B layer) is laminated on at least one surface of the base material layer (A layer) to improve a surface property as one embodiment of the present invention.

B layer contains 70 mass % or more of a Polyamide 6 resin.

The biaxially stretched polyamide film excellent in a mechanical strength such as an impact strength and a gas barrier property against oxygen or the like can be obtained by containing 70 mass % or more of a Polyamide 6 resin in B layer.

A similar Polyamide 6 resin to that usable in the above-described A layer may be used as the Polyamide 6 resin.

The B layer may contain various additives such as other thermoplastic resin, lubricant, heat stabilizer, antioxidant, antistatic agent, antifog additive, ultraviolet absorber, dye and pigment depending on the function for the B layer surface.

When the B layer is used as the outer surface of a packaging bag, the B layer does not preferably contain a soft resin such as a polyamide elastomer and a polyolefin elastomer nor a substance that generates a large amount of a void in order to ensure a friction pinhole resistance.

The B layer may contain other thermoplastic resin in addition to the above-described Polyamide 6 as long as the objective of the present invention is not impaired. An example of the other thermoplastic resin includes a polyamide resin such as Polyamide MXD6 resin, Polyamide 11 resin, Polyamide 12 resin, Polyamide 66 resin, Polyamide 6.12 copolymer resin and Polyamide 6·66 copolymer resin.

The B layer may contain a thermoplastic resin other than a polyamide, such as a polyester polymer and a polyolefin polymer. An example of the polyester polymer includes polyethylene terephthalate, polybutylene telephthalate and polyethylene-2,6-naphthalate. An example of the polyolefin polymer includes polyethylene and polypropylene.

The B layer preferably contains a lubricant such as a fine particle and an organic lubricant to improve a lubrication property of the film.

When the lubrication property is good, a handling property of the film is improved and a packaging bag tear due to friction is reduced.

The above-described fine particle may be appropriately selected to be used from an inorganic fine particle and a polymer organic fine particle. An example of the inorganic fine particle includes silica, kaolin and zeolite, and an example of the polymer organic fine particle includes acrylate and polystyrene. A silica fine particle is preferably used with respect to a transparency and lubrication property.

A preferred average particle diameter of the above-described fine particle is 0.5 to 5.0 μm and more preferably 1.0 to 3.0 μm. When the average particle diameter is less than 0.5 μm, a large additive amount is required for a good lubrication property. On the one hand, when the average particle diameter is more than 5.0 μm, an appearance tends to become worse due to an excessive large surface roughness of a film.

When the above-described silica fine particle is used, a pore volume of the silica is preferably 0.5 to 2.0 ml/g and more preferably 0.8 to 1.6 ml/g. When the pore volume is less than 0.5 ml/g, a void may be easily formed and a transparency of a film may become worse. When the pore volume is more than 2.0 ml/g, a surface protrusion due to a fine particle tends to be difficult to be formed.

A fatty acid amide and/or a fatty acid bisamide may be contained as the above-described organic lubricant. An example of the fatty acid amide and/or fatty acid bisamide includes erucamide, stearamide, ethylene bis(stearamide), ethylene bis(behenic acid amide) and ethylene bis(oleic amide).

A content amount of the fatty acid amide and/or fatty acid bisamide in the B layer is preferably 0.01 to 0.40 mass % and more preferably 0.05 to 0.30 mass %. When the content amount of the fatty acid amide and/or fatty acid bisamide is less than the above-described range, a lubrication property tends to become worse. On the one hand, the content amount is more than the above-described range, a wettability tends to become worse.

The B layer may contain a polyamide resin other than Polyamide 6 in order to improve a lubrication property of the film, such as Polyamide MXD6 resin, Polyamide 11, Polyamide 12 resin, Polyamide 66 resin, Polyamide 6.12 copolymer resin and Polyamide 6.66 copolymer resin. A Polyamide MXD6 resin is particularly preferred, and 1 to 10 mass % is preferably added. When the additive amount is less than 1 mass %, an effect to improve a lubrication property of the film is not sufficient. When the additive amount is more than 10 mass %, an effect to improve a lubrication property of the film is saturated.

A Polyamide MXD6 resin is produced by a polycondensation of m-xylylenediamine and adipic acid.

A relative viscosity of Polyamide MXD6 is preferably 1.8 to 4.5 and more preferably 2.0 to 3.2. When the relative viscosity is less than 1.8 and more than 4.5, a mixing with a polyamide resin may become difficult in an extruder in some cases.

When a fine particle, an organic lubricant or a polyamide resin such as a Polyamide MXD6 resin is added in the B layer to improve a lubrication property, the components are preferably added to the raw material layer (A layer) in a small amount to obtain the film excellent in a transparency and a lubrication property.

A polyamide resin other than Polyamide 6 may be added in the B layer to improve an adhesion property. Such a polyamide resin is preferably a copolymer polyamide resin such as Polyamide 6.12 copolymer resin and Polyamide 6.66 copolymer resin in such a case.

An antioxidant may be contained in the B layer of the biaxially stretched polyamide film according to the present invention similarly to the above-described A layer.

An auxiliary material and an additive such as a lubricant and an antioxidant may be added to the biaxially stretched polyamide film or the base material layer (A layer) and the surface layer (B layer) of the present invention during a resin polymerization and a melt extrusion using an extruder. A master batch having a high concentration is produced, and such a master batch may be added to the polyamide resin during a film production. The additive may be added in accordance with such a publicly known method.

Biaxially Stretched Polyamide Film

A thickness of the biaxially stretched polyamide film according to the present invention is not particularly restricted. When the film is used as a packaging material, the thickness is generally 100 μm or less. In general, the film having a thickness of 5 to 50 μm is used, and the film having a thickness of 8 to 30 μm is particularly used.

When the thickness of the B layer occupies the most of the total thickness of the film in the thickness constitution of each layer of the biaxially stretched polyamide film according to the present invention, a folding pinhole resistance may become worse. Thus, the thickness of the A layer in the total thickness of the A layer and the B layer is preferably 50 to 93% and particularly 70 to 93% in the present invention.

When a twist bending test is conducted at 1° C. 1000 times using a Gelbo Flex tester by the measurement method described in Examples, the number of a pinhole defect of the biaxially stretched polyamide film according to the present invention is 10 or less. The number is more preferably 5 or less. When the number of a pinhole defect after a bending test is smaller, a folding pinhole resistance is excellent. When the number of a pinhole is 10 or less, a packaging bag on which a pinhole is less likely to occur even under a load on the packaging bag at the time of transportation or the like can be produced.

A distance leading to pinhole formation by a friction pinhole resistance test is 2900 cm or more with respect to the biaxially stretched polyamide film of the present invention. The distance is more preferably 3100 cm or more and even more preferably 3300 cm or more. When the distance leading to pinhole formation is longer, a friction pinhole resistance is excellent. Even when a packaging bag having the distance leading to pinhole formation of 2900 cm or more is rubbed with a cardboard box or the like at the time of transportation or the like, a pinhole is less likely to occur on the packaging bag.

The biaxially stretched polyamide film of the present invention is excellent in both of the above-described folding pinhole resistance and friction pinhole resistance. Such a biaxially stretched polyamide film of the present invention is very useful as a film for packaging, since a pinhole is less likely to occur at the time of transportation.

Heat shrinkage rates of the present invention film at 160° C. for 10 minutes in both of the machine direction and the transverse direction are included in 0.6 to 3.0% and preferably 0.6 to 2.5%. Hereinafter, the machine direction is abbreviated as MD direction and the transverse direction is abbreviated as TD direction. When the heat shrinkage rate is more than 3.0%, a curl and a shrinkage may be generated due to a heat in the subsequent step such as laminating and printing in some cases. In addition, a laminate strength with a sealant film may become weak in some cases. The heat shrinkage rate may be adjusted to less than 0.6% but the film may mechanically become brittle in some cases. In addition, the heat shrinkage rate of less than 0.6% is not preferred, since the productivity may become worse.

The biaxially stretched polyamide film is excellent in an impact resistance, and an impact strength of the biaxially stretched polyamide film according to the present invention is preferably 0.7 J/15 μm or more. The impact strength is more preferably 0.9 J/15 μm or more.

A Haze value of the biaxially stretched polyamide film according to the present invention is preferably 10% or less, more preferably 7% or less and even more preferably 5% or less.

When the film having a small Haze value is used for a packaging bag, a beautiful print becomes possible and a product value is increased due to good transparency and gloss. When a fine particle is added to improve a lubrication property of the film, the Haze value becomes large. The Haze value, therefore, may be adjusted to be small by adding the fine particle in the B layer as a surface layer only.

A content amount of a carbon derived from a biomass in the biaxially stretched polyamide film of the present invention, measured by a radioactive carbon ($C^{14}$) measurement in accordance with ASTM D6866-16, is preferably 1 to 15% to the total carbon in the polyamide film. The content amount is also referred to as a biomass degree.

Since the carbon dioxide in the air contains $C^{14}$ in a constant rate of 105.5 pMC, it is known that a content amount of $C^{14}$ in a plant that grows up by absorbing the carbon dioxide in the air, such as corn, is also about 105.5 pMC. In addition, it is known that a fossil fuel contains little $C^{14}$. Thus, the ratio of the carbon derived from a biomass can be calculated by measuring a ratio of $C^{14}$ contained in the total carbon atoms in the polyamide.

A laminate strength of the biaxially stretched polyamide film according to the present invention after being bonded to a polyethylene sealant described in Examples is 4.0 N/15 mm or more.

A biaxially stretched polyamide film is generally laminated on a sealant film and then processed into a packaging bag. When the biaxially stretched polyamide film of the present invention having a laminate strength of 4.0 N/15 mm or more is used for producing a packaging bag in various laminate constitutions, a strength at the sealing part is sufficiently high and a tear-proof strong packaging bag can be produced.

The biaxially stretched polyamide film of the present invention may be subjected to corona treatment, coating treatment, flame treatment or the like to adjust the laminate strength to be 4.0 N/15 mm or more.

Method for Producing Film

The biaxially stretched polyamide film of the present invention can be produced by a publicly known production method.

An example of such a production method includes a sequentially biaxially stretching method and a simultaneously stretching method. A sequentially biaxially stretching method is preferred in terms of a production cost due to an increased film formation speed.

A method for producing the biaxially stretched polyamide film of the present invention is described.

First, a raw material resin is melted and extruded using an extruder from a T-die into a form of a film and cast on a cooling roll for cooling to obtain an unstretched film.

When the biaxially stretched polyamide film in which the surface layer (B layer) is laminated on at least one surface of the base material layer (A layer) is produced, a coextrusion method using a feed block or a multi-manifold is preferred to prepare an unstretched film by laminating the A layer and the B layer. A dry laminate method, an extrusion laminate method or the like may be selected other than a coextrusion method.

The difference of melt viscosities of the A layer and the B layer is preferably adjusted to be smaller by selecting the polyamide resin compositions used for the A layer and the B layer in the case where the A layer and the B layer are laminated by a coextrusion method.

A melting temperature of the resin is preferably 220 to 350° C. When the melting temperature is lower than the above range, an unmelted material may be generated and a poor appearance such as a defect may be generated. When the melting temperature is higher than the above range, a molecular weight may be decreased and an appearance may become poor due to a deterioration of the resin. A temperature of a die is preferably 250 to 350° C.

A temperature of a cooling roll is preferably -30 to 80° C. and more preferably 0 to 50° C.

For example, a method using an air knife and an electrostatic adhesion method to apply an electrostatic charge are preferably used in order to prepare an unstretched film by casting and cooling a melted material extruded from a T-die on a rotated cooling dram in a form of a film. The latter method is particularly preferably used.

An opposite surface of a cooling roll of a surface on which an unstretched film is cast is preferably cooled. For example, a method in which a liquid for cooling in a tank is contacted with an opposite surface of a cooling roll for an unstretched film, a method in which a liquid to be evaporated is applied using a spray nozzle, a method for cooling by blowing a fluid at high speed and the like are preferably used in combination. The biaxially stretched polyamide film of the present invention can be produced by stretching the thus obtained unstretched film in biaxial directions.

Any one of a simultaneously biaxially stretching method and a sequentially stretching method can be used as a stretching method.

A single-stage stretching or a multistage stretching such as a two-stage stretching can be used as a stretching method in MD direction in both of cases. A multi-stage stretching such as two-stage stretching, not a single-stage stretching, in MD direction is preferred in terms of a physical property and a homogeneity or an isotropy of a physical property in MD direction and TD direction as described later.

A roll stretching is preferred as a stretching in MD direction in a sequentially biaxially stretching method.

The lower limit of a temperature for a stretching in MD direction is preferably 50° C., more preferably 55° C. and even more preferably 60° C. When the temperature is lower than 50° C., the resin may not become soften and a stretching may be difficult in some cases.

The upper limit of a temperature for a stretching in MD direction is preferably 120° C., more preferably 115° C. and even more preferably 110° C. When the temperature is higher than 120° C., the resin may excessively become soften and may not stably stretched.

The lower limit of a stretching ratio in MD direction is preferably 2.2 times, more preferably 2.5 times and even more preferably 2.8 times. The stretching ratio means a total stretching ratio by adding each ratio in the case of a multi-stage stretching. When the stretching ratio is less than 2.2 times, a thickness accuracy in MD direction may become worse and additionally an impact strength may become worse due to too low crystallinity degree in some cases.

The upper limit of a stretching ratio in MD direction is preferably 5.0 times, more preferably 4.5 times and the most preferably 4.0 times. When the stretching ratio is more than 5.0 times, a subsequent stretching may be difficult in some cases.

The above-described stretching is possible as each stretching in the case of a multi-stage stretching in MD direction. The total stretching ratio in a total MD direction is needed to be adjusted to 5.0 or less. For example, a stretching ratio of the first stage is preferably 1.5 to 2.1 times and a stretching ratio of the second stage is preferably 1.5 to 1.8 times in the case of a two-stage stretching.

A film stretched in MD direction is stretched in TD direction using a tenter, set by heat and subjected to a relaxing treatment. The relaxing treatment is also referred to as relaxation treatment.

The lower limit of a temperature for a stretching in TD direction is preferably 50° C., more preferably 55° C. and even more preferably 60° C. When the temperature is lower than 50° C., the resin may not become soften and a stretching may be difficult in some cases.

The upper limit of a temperature for a stretching in TD direction is preferably 190° C., more preferably 185° C. and even more preferably 180° C. When the temperature is higher than 190° C., the resin may be crystalized and a stretching may be difficult in some cases.

The lower limit of a stretching ratio in TD direction is 2.8, more preferably 3.2 times, even more preferably 3.5 times and particularly preferably 3.8 times. The stretching ratio means a total stretching ratio by adding each ratio in the case of a multi-stage stretching. When the stretching ratio is less than 2.8 times, a thickness accuracy in TD direction may become worse and additionally an impact strength may become worse due to too low crystallinity degree in some cases.

The upper limit of a stretching ratio in TD direction is preferably 5.5 times, more preferably 5.0 times, even more preferably 4.7, particularly preferably 4.5 and the most preferably 4.3 times. When the stretching ratio is more than 5.5 times, the productivity may be remarkably decreased in some cases.

A selection of a heat setting temperature is an important matter in the present invention. When the heat setting temperature is adjusted to be higher, the film is crystallized and an orientation of the film is relaxed, an impact strength is improved, and a heat shrinkage rate can be reduced. On the one hand, when the heat setting temperature is low, crystallization and a relax of an orientation is insufficient, and a heat shrinkage rate cannot be sufficiently reduced. In addition, when the heat shrinkage temperature is excessively high, the resin is deteriorated and a toughness such as an impact strength of a film is rapidly lost.

The lower limit of a heat setting temperature is preferably 210° C. and more preferably 212° C. When the heat setting temperature is low, a heat shrinkage rate excessively becomes large, an appearance after lamination is destroyed and a laminate strength tends to be lowered.

The upper limit of a heat setting temperature is preferably 220° C. and more preferably 218° C. When the heat setting temperature is excessively high, an impact strength tends to be lowered.

A time for a heat setting is preferably 0.5 to 20 seconds and more preferably 1 to 15 seconds. A time for a heat setting may be appropriately adjusted depending on a heat setting temperature and a wind speed in a heat setting zone. When a heat setting condition is weak, crystallization and a relax of an orientation become insufficient and the above-described problems are caused. When a heat setting condition is strong, a toughness of a film is lowered.

A relax treatment after a heat setting treatment is effective for a control of a heat shrinkage rate. A temperature for a relax treatment can be adjusted in the range from a heat setting treatment temperature to a glass transformation temperature (Tg) of the resin and preferably from a heat setting treatment temperature −10° C. to Tg +10° C. An excessively high relax temperature is not preferred, since too fast shrinkage rate causes a strain or the like. On the one hand, when a relax temperature is excessively low, a relax treatment is insufficient, the film is merely relaxed and a heat shrinkage rate cannot be reduced, and a dimensional stability becomes worse.

The lower limit of a relax rate of a relax treatment is preferably 0.5% and more preferably 1%. When the relax rate is less than 0.5%, a heat shrinkage rate may not be sufficiently reduced in some cases.

The upper limit of a relax rate is preferably 20%, more preferably 15% and even more preferably 10%. When the relax rate is more than 20%, a slack is caused in a tenter and the production may become difficult in some cases.

The biaxially stretched polyamide film of the present invention can be subjected to a heat treatment and a humidity treatment depending on a use application in order to improve a dimensional stability. In addition, the biaxially stretched polyamide film can be subjected to a corona treatment, a coating treatment, a flame treatment or the like in order to improve an adhesion property of the film surface, and to a print processing and a vapor deposition processing of a metal substance, inorganic oxide or the like. A deposited membrane of aluminium or a deposited membrane of a single material or a mixture of a silicon oxide or an aluminium oxide is preferably used as a deposited membrane formed by a deposition processing. A barrier property against oxygen and hydrogen can be improved by coating a protective layer on the deposited membranes.

A laminate film is produced by laminating a sealant film or the like on the biaxially stretched polyamide film of the present invention and then processed into a packaging bag.

An example of a sealant film includes unstretched linear low density polyethylene film, unstretched polypropylene film and ethylene-vinyl alcohol copolymer resin film.

A layer constitution of the laminate film according to the present invention prepared from the biaxially stretched polyamide film of the present invention is not particularly restricted as long as the laminate film contains the biaxially stretched polyamide film of the present invention. A film usable in the laminate film may be derived from a petroleum compound and a biomass as a raw material, and polylactate, polyethylene terephthalate, polybutylene succinate, polyethylene, polyethylenefuranoate or the like polymerized from a raw material derived from a biomass is more preferred in terms of a reduction of environmental load.

An example of a layer constitution of the laminate film according to the present invention includes ONY/Adhesive/LLDPE, ONY/Adhesive/CPP, ONY/Adhesive/Al/Adhesive/CPP, ONY/Adhesive/Al/Adhesive/LLDPE, ONY/PE/Al/Adhesive/LLDPE, ONY/Adhesive/Al/PE/LLDPE, PET/Adhesive/ONY/Adhesive/LLDPE, PET/Adhesive/ONY/PE/LLDPE, PET/Adhesive/ONY/Adhesive/Al/Adhesive/LLDPE, PET/Adhesive/Al/Adhesive/ONY/Adhesive/LLDPE, PET/Adhesive/Al/Adhesive/ONY/PE/LLDPE, PET/PE/Al/PE/ONY/PE/LLDPE, PET/Adhesive/ONY/Adhesive/CPP, PET/Adhesive/ONY/Adhesive/Al/Adhesive/CPP, PET/Adhesive/Al/Adhesive/ONY/Adhesive/CPP, ONY/Adhesive/PET/Adhesive/LLDPE, ONY/Adhesive/PET/PE/LLDPE, ONY/Adhesive/PET/Adhesive/CPP, ONY//Al//PET//LLDPE, ONY/Adhesive/Al/Adhesive/PET/PE/LLDPE, ONY/PE/LLDPE, ONY/PE/CPP, ONY/PE/Al/PE, ONY/PE/Al/PE/LLDPE, OPP/Adhesive/ONY/Adhesive/LLDPE, ONY/Adhesive/EVOH/Adhesive/LLDPE, ONY/Adhesive/EVOH/Adhesive/CPP, ONY/Adhesive/Al-deposited PET/Adhesive/LLDPE, ONY/Adhesive/Al-deposited PET/Adhesive/ONY/Adhesive/LLDPE, ONY/Adhesive/Al-deposited PET/PE/LLDPE, ONY/PE/Al-deposited PET/PE/LLDPE, ONY/Adhesive/Al-deposited PET/Adhesive/CPP, PET/Adhesive/Al-deposited PET/Adhesive/ONY/Adhesive/LLDPE, CPP/Adhesive/ONY/Adhesive/LLDPE, ONY/Adhesive/Al-deposited LLDPE and ONY/Adhesive/Al-deposited CPP on the basis that "/" represents the boundary between layers.

Each abbreviated name used in the above-described layer constitutes is described as follows.

ONY: biaxially stretched polyamide film of the present invention, PET: stretched polyethylene terephthalate film, LLDPE: unstretched linear low density polyethylene film, CPP: unstretched polypropylene film, OPP: stretched polypropylene film, PE: extruded laminate or unstretched low density polyethylene film, Al: aluminum foil, EVOH: ethylene-vinyl alcohol copolymer resin, Adhesive: adhesive layer to bond films, Al-deposited: deposited by aluminum.

EXAMPLES

Hereinafter, the present invention is described more specifically with the examples, but the present invention is not restricted by the following examples. The film was evaluated by the following measurement methods. The film was measured in a measurement chamber under an environment at 23° C. and at 65% relative humidity unless specified otherwise.

(1) Haze Value of Film

A Haze value was measured using a direct reading Haze meter manufactured by Toyo Seiki Seisaku-sho in accordance with JIS-K-7105.

(2) Thickness of Film

The ten films were stacked and cut into ten equal parts in the TD direction and in the length of 100 mm in the MD direction. The film having a narrow width was equally cut so that the width by which the thickness could be measured was ensured. The cut film was conditioned under an environment at 23° C. and at 65% relative humidity for 2 hours or more. The thickness in the middle of each sample was measured using a thickness gauge manufactured by TESTER SANGYO, and an average value thereof was regarded as a thickness.

(3) Biomass Degree of Film

A biomass degree of the produced film was measured by a radiocarbon ($C^{14}$) measurement in accordance with ASTM D6866-16 Method B (AMS).

(4) Heat Shrinkage Rate of Film

A heat shrinkage rate was measured in accordance with a dimensional change test method described in JIS C2318 except that a test temperature was adjusted to 160° C. and a heating time was adjusted to 10 minutes and calculated on the basis of the following formula.

Heat shrinkage rate=[(length before treatment−length after treatment)/length before treatment]×100 (%)

(5) Impact Strength of Film

An impact strength was measured using a film impact tester manufactured by Toyo Seiki Seisaku-sho. The measurement value was converted per a thickness of 15 um and represented by J/15 μm.

(6) Dynamic Friction Coefficient of Film

A dynamic friction coefficient was evaluated between the external surfaces of film rolls in the following condition in accordance with JIS-C2151. The width of the sample was 130 mm, the length was 250 mm, and the testing speed was adjusted to 150 mm/min.

(7) Folding Pinhole Resistance of Film

The number of a folding fatigue pinhole was measured using a Gelbo flex tester manufactured by Rigaku Kogyo by the following method.

A polyester adhesive was applied on the film produced by Examples, a linear low density polyethylene film (L-LDPE film, "L4102" manufactured by TOYOBO) having a thickness of 40 μm was laminated thereon in a dry condition, and the laminate was aged under an environment at 40° C. for 3 days to obtain a laminate film. The laminate film was cut into 12 inch×8 inch and formed into a cylinder having a diameter of 3.5 inch. One edge of the cylindrical film was fixed on the fixation head side of a Gelbo flex tester, the other edge was fixed on the movable head side, and the initial holding interval was adjusted to 7 inch. A folding fatigue was given to the film by twisting the film at 440° at initial 3.5 inch of the stroke and then conducting a linear horizontal movement in the subsequent 2.5 inch to finish the total stroke at a rate of 40 times/min 1000 times under an environment at 1° C., and the number of pinholes generated in the laminate film was counted. The test film was placed on a filter paper (Advantech, No. 50) with facing down the L-LDPE film side, and the four corners were fixed using Sellotape (registered trademark). An ink (commodity number: INK-350-blue, manufactured by PILOT) was diluted 5 times by pure water, applied to the test film and extended on the one surface using a gum roller. After an extra ink was wiped, the test film was removed and the number of ink dots on the filter paper was counted.

(8) Friction Pinhole Resistance of Film

A friction test was conducted using a rubbing fastness tester manufactured by Toyo Seiki Seisaku-sho by the following method to measure a pinhole generating distance.

The laminate film similar to that produced for the above-described folding pinhole resistance evaluation was folded in four and the corner was sharpened to prepare a test sample. The test sample was rubbed on the inner surface of a cardboard using the rubbing fastness tester in the condition of an amplitude of 25 cm, an amplitude rate of 30 times/min and a weight of 100 g weight. The cardboard of K280×P180×K210 (AF)=(surface material liner×core material×backing material liner (kind of flute)) was used.

A pinhole generating distance was calculated in accordance with the following procedure. When a pinhole generating distance is longer, a friction pinhole resistance is excellent.

First, a friction test was conducted in the condition of an amplitude of 100 times and a distance of 2500 cm. When a pinhole was not generated, a friction test was conducted by increasing an amplitude times and a distance by 20 times and 500 cm. When a pinhole was still not generated, a friction test was conducted by further increasing an amplitude times and a distance by 20 times and 500 cm. This procedure was repeated, and the distance at which a pinhole was generated was marked with × as Level 1. When a pinhole was generated in the condition of an amplitude of 100 times and a distance of 2500 cm, a friction test was conducted by decreasing an amplitude times and a distance by 20 times and 500 cm. When a pinhole was still generated, a friction test was conducted by further decreasing an amplitude times and a distance by 20 times and 500 cm. This procedure was repeated, and the distance at which a pinhole was not generated was marked with ○ as Level 1.

Then, as Level 2, when the last result was ○ in Level 1, the number of an amplitude was increased by 20 times to conduct a friction test. The case that a pinhole was not generated was regarded as ○, and the case that a pinhole was generated was regarded as ×. When the last result was × in Level 1, the number of an amplitude was decreased by 20 times to conduct a friction test. The case that a pinhole was not generated was regarded as ○, and the case that a pinhole was generated was regarded as ×.

Further, as Levels 3 to 20, when the last result was ○ in the previous Level, the number of an amplitude was increased by 20 times to conduct a friction test. The case that a pinhole was not generated was regarded as ○, and the case that a pinhole was generated was regarded as ×. When the result was × in the previous Level, the number of an amplitude was decreased by 20 times to conduct a friction test. The case that a pinhole was not generated was regarded as ○, and the case that a pinhole was generated was regarded as ×. The above procedure was repeated, and Levels 3 to 20 were evaluated to be ○ or ×.

For example, the result shown in Table 1 was obtained. A method for determining a pinhole generation distance is explained using Table 1 as an example.

The numbers of the test results of ○ and × were counted in each distance.

The distance in which the test number was the largest was regarded as the median value, and the coefficient was regarded as zero. If the distance was longer than the median value, the coefficient was regarded as +1, +2, +3 - - - for every 500 cm, and if the distance was shorter than the median value, the coefficient was regarded as −1, −2, −3 - - - for every 500 cm.

The number of the test in the case where a pinhole was not generated and the number of the test in the case where a pinhole was generated were compared in all of the tests of Levels 1 to 20, and a friction pinhole generation distance was calculated by the respective formula in the cases of the following A and B.

A: case where the number of the test without pinhole was the number of the test with pinhole or more in all of the tests Friction pinhole generation distance=median value+500× (Σ(coefficient×number of test without pinhole)/number of test without pinhole)+1/2)

B: case where the number of the test without pinhole is less than the number of the test with pinhole in all of the tests Friction pinhole generation distance=median value+500× (Σ(coefficient×number of test with pinhole)/number of test with pinhole)−1/2)

TABLE 1

A: When the test number in the case where a pinhole was not generated (○) is the test number in the case where a pinhole was generated (×) or more in all of the tests, Friction pinhole generation distance = median value + 500 × (Σ(coefficient × test number in case where a pinhole was not generated)/test number in the case where a pinhole was not generated) + 1/2) Friction pinhole generation distance = 3500 + 500 × (−4/10 + 1/2) = 3550

| Amplitude number | Amplitude distance | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| 180 | 4500 | | | | | | | | | | | | | | |
| 160 | 4000 | | | | | × | | × | | | | | | | × |

TABLE 1-continued

| | | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| 140 | 3500 | x | x | | | ○ | ○ | x | x | | | ○ | | | |
| 120 | 3000 | | | ○ | ○ | | | | | ○ | ○ | | | | |
| 100 | 2500 | | | | | | | | | | | | | | |

B: When the test number in the case where a pinhole was not generated (x) is less than the test number in the case where a pinhole was generated (○) in all of the tests,
Friction pinhole generation distance = median value + 500 × (Σ(coefficient × test number in case where a pinhole was generated)/test number in the case where a pinhole was generated) − 1/2) Friction pinhole generation distance = 3000 + 500 × (3/11 − 1/2) = 2886

| Amplitude number | Amplitude distance | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| 160 | 4000 | | | | | | | | | | | | | | |
| 140 | 3500 | | | | | ○ | x | x | | | | | | | x |
| 120 | 3000 | x | x | ○ | ○ | | | | x | x | | | ○ | | |
| 100 | 2500 | ○ | ○ | | | | | | | | ○ | ○ | | | |
| 80 | 2000 | | | | | | | | | | | | | | |

A: When the test number in the case where a pinhole was not generated (○) is the test number in the case where a pinhole was generated (x) or more in all of the tests,
Friction pinhole generation distance = median value + 500 × (Σ(coefficient × test number in case where a pinhole was not generated)/test number in the case where a pinhole was not generated) + 1/2) Friction pinhole generation distance = 3500 + 500 × (−4/10 + 1/2) = 3550

| Amplitude number | 15 | 16 | 17 | 18 | 19 | 20 | Number of ○ | Number of x | Coefficient | Number * coefficient |
|---|---|---|---|---|---|---|---|---|---|---|
| 180 | | | | | | | | | | |
| 160 | | x | x | | x | | 0 | 6 | 1 | 0 |
| 140 | | ○ | ○ | | ○ | | 6 | 4 | 0 | 0 |
| 120 | | | | | | | 4 | 0 | −1 | −4 |
| 100 | | | | | | | | | | |
| Total | | | | | | | 10 | 10 | A | −4 |

B: When the test number in the case where a pinhole was not generated (x) is less than the test number in the case where a pinhole was generated (○) in all of the tests,
Friction pinhole generation distance = median value + 500 × (Σ(coefficient × test number in case where a pinhole was generated)/test number in the case where a pinhole was generated) − 1/2) Friction pinhole generation distance = 3000 + 500 × (3/11 − 1/2) = 2886

| Amplitude number | 15 | 16 | 17 | 18 | 19 | 20 | Number of ○ | Number of x | Coefficient | Number * coefficient |
|---|---|---|---|---|---|---|---|---|---|---|
| 160 | | | | | | | | | | |
| 140 | | x | | | | | 0 | 4 | 1 | 4 |
| 120 | ○ | | x | | x | | 4 | 6 | 0 | 0 |
| 100 | | | | ○ | | x | 5 | 1 | −1 | −1 |
| 80 | | | | | | | | | | |
| Total | | | | | | | 9 | 11 | B | 3 |

(9) Laminate Strength with Polyethylene Sealant

A laminate film was prepared by a similar method to the method described in the folding pinhole resistance evaluation and cut into a rectangle of width 15 mm×length 200 mm. The one edge of the laminate film was peeled at the interface between the biaxially stretched polyamide film and the linear low density polyethylene film, and a laminate strength was measured using an autograph manufactured by SHIMADZU CORPORATION in the MD direction and the TD direction 3 times respectively in the condition at a temperature of 23° C., 65% relative humidity, a tension rate of 200 mm/min and a peeling angle of 90°. The laminate strength was evaluated as the average value thereof.

(10) Film Forming Stability During Casting

The melted resin was extruded from a T-die into a form of a film, and cast on a cooling roll to obtain an unstretched film. A film forming stability was evaluated by observing this step on the basis of the following criteria.

Excellent: film forming was stable and uniform unstretched film could be obtained.

Good: film forming was a little unstable and the width of the unstretched film was not constant but biaxially stretching was possible.

Bad: a biaxially stretched film could not be obtained, since film forming was unstable and unstretched film was not uniform.

(11) Generation Cycle of Thermally Deteriorated Material at Die Lip Entrance

The lip of dies was cleaned, a film forming was started, and a time that elapsed before a thermally deteriorated material was generated at a die lip was determined.

(12) Relative Viscosity of Raw Material Polyamide

A 1.0 g/dl polyamide solution was prepared by dissolving 0.25 g of a polyamide in 96% sulfuric acid in 25 mL measuring flask, and a relative viscosity of the solution was measured at 20° C.

(13) Melting Point of Raw Material Polyamide

A melting point was measured as an endothermic peak temperature (Tmp) using SSC5200 type differential scanning calorimeter manufactured by Seiko Instruments in a nitrogen atmosphere in a condition of a sample weight: 10 mg, a temperature rising start temperature: 30° C. and a temperature rising rate: 20° C./min in accordance with JIS K7121.

Example 1-1

The melted following resin composition was extruded from a T-die in a form of a film using an apparatus consisting of an extruder and T-die having a width of 380 mm, and cast and electrostatically adhered on a cooling roll of which temperature was adjusted to 20° C. to obtain an unstretched film having a thickness of 200 μm.

Resin composition: consisting of 97 mass parts of Polyamide 6 (manufactured by TOYOBO, relative viscosity: 2.8, melting point: 220° C.), 3.0 mass parts of Polyamide 11 (manufactured by Arkema, relative viscosity: 2.5, melting point: 186° C.), 0.45 mass parts of porous silica fine particle (manufactured by FUJI SILYSIA CHEMICAL, average particle diameter: 2.0 μm, pore volume: 1.6 mL/g) and 0.15 mass parts of fatty acid bisamide (ethylenebisstearamide, manufactured by Kyoei Kagaku Kogyo)

The obtained unstretched film was supplied to a roll type stretching machine, and stretched 1.73 times in the MD direction at 80° C. using a difference in circumferential speeds and then further stretched 1.85 times at 70° C. Subsequently, the uniaxial stretched film was continuously supplied to a tenter type stretching machine and preliminarily heated at 110° C. The film was stretched 1.2 times at 120° C., 1.7 times at 130° C. and 2.0 times at 160° C. in the TD direction and was subjected to a heat setting treatment at 218° C. The film was relaxed by 7% at 218° C., and then the surface to be dry-laminated with a liner low density polyethylene film was subjected to a corona discharge treatment to obtain a biaxially stretched polyamide film. The evaluation result of the obtained biaxially stretched film is shown in Table 2.

Examples 1-2 to 1-9 and Comparative Examples 1-1 to 1-5

Biaxially stretched films were produced by the similar to Example 1 except that a film forming condition such as a raw material resin composition and a heat setting temperature was changed as Table 2. The evaluation results of the obtained biaxially stretched films are shown in Table 2.

The following compounds of which at least a part contained a raw material derived from a biomass were respectively used as Polyamide 410, Polyamide 610 and Polyamide 1010.

Polyamide 410: ECOPaXX Q150-E manufactured by DSM, melting point: 250° C.

Polyamide 610: RilsanS SMNO manufactured by Arkem, melting point: 222° C.

Polyamide 1010: RilsanT TMNO manufactured by Arkema, melting point: 202° C.

A biaxially stretching was impossible in Comparative example 1-4, since a melted resin could not be stably extruded from a T-die and thereby au uniform unstretched film could not be obtained.

TABLE 2

| | | | Example | | | | | | |
| --- | --- | --- | --- | --- | --- | --- | --- | --- | --- |
| | | | 1-1 | 1-2 | 1-3 | 1-4 | 1-5 | 1-6 | 1-7 |
| Composition | Polyamide 6 | mass parts | 97 | 95 | 90 | 85 | 75 | 95 | 95 |
| | Polyamide 11 | mass parts | 3 | 5 | 10 | 15 | 25 | 5 | — |
| | Polyamide 410 | mass parts | — | — | — | — | — | — | 5 |
| | Polyamide 610 | mass parts | — | — | — | — | — | — | — |
| | Polyamide 1010 | mass parts | — | — | — | — | — | — | — |
| | Polyamide elastomer | mass parts | — | — | — | — | — | — | — |
| | Fine particle | mass % | 0.45 | 0.45 | 0.45 | 0.45 | 0.45 | 0.45 | 0.45 |
| | Fatty acid amide | mass % | 0.15 | 0.15 | 0.15 | 0.15 | 0.15 | 0.15 | 0.15 |
| MD stretch temperature | | ° C. | 80 | 80 | 80 | 80 | 80 | 80 | 80 |
| MD stretch ratio | | — | 3.2 | 3.2 | 3.2 | 3.2 | 3.2 | 3.0 | 3.2 |
| TD stretch temperature | | ° C. | 130 | 130 | 130 | 130 | 130 | 130 | 130 |
| TD stretch ratio | | — | 4.0 | 4.0 | 4.0 | 4.0 | 4.0 | 3.3 | 4.0 |
| TD heat setting temperature | | ° C. | 218 | 218 | 218 | 218 | 218 | 210 | 218 |
| TD relax temperature | | ° C. | 218 | 218 | 218 | 218 | 218 | 210 | 218 |
| TD relax ratio | | % | 7 | 7 | 7 | 7 | 7 | 7 | 7 |
| Thickness | | μm | 15 | 15 | 15 | 15 | 15 | 15 | 15 |
| Biomass degree | | % | 2.7 | 4.5 | 9.0 | 13.5 | 22.5 | 4.5 | 4.4 |
| Haze | | % | 2.5 | 2.7 | 2.9 | 3.2 | 4.9 | 2.8 | 3.5 |
| Impact strength | | J/15 μm | 1.2 | 1.2 | 1.2 | 1.2 | 1.1 | 1.4 | 1.2 |
| Pinhole strength (1° C.) | | Number | 3 | 3 | 5 | 4 | 4 | 4 | 5 |
| Friction pinhole strength | | cm | 3200 | 3300 | 3100 | 3250 | 3200 | 3300 | 3500 |
| Heat shrinkage rate | MD | % | 0.9 | 1.0 | 0.9 | 1.1 | 1.2 | 1.6 | 1.2 |
| | TD | % | 0.9 | 1.0 | 1.1 | 1.3 | 1.3 | 0.9 | 1.4 |
| Laminate strength | MD | N/mm | 6.9 | 6.7 | 7.4 | 7.1 | 7.1 | 3.1 | 6.9 |
| | TD | N/mm | 6.5 | 6.4 | 6.9 | 7.0 | 6.9 | 3.0 | 6.8 |
| Film formation stability at the time of casting | | — | Excellent | Excellent | Excellent | Excellent | Good | Excellent | Excellent |
| Thermal deteriorated product generation cycle | | Time | 36 | — | — | — | — | — | — |

TABLE 2-continued

|  |  |  | Example | | Comparative example | | | | |
|---|---|---|---|---|---|---|---|---|---|
|  |  |  | 1-8 | 1-9 | 1-1 | 1-2 | 1-3 | 1-4 | 1-5 |
| Composition | Polyamide 6 | mass parts | 95 | 95 | 100 | 100 | 99.5 | 65 | 97 |
|  | Polyamide 11 | mass parts | — | — | — | — | 0.5 | 35 | — |
|  | Polyamide 410 | mass parts | — | — |  |  |  |  |  |
|  | Polyamide 610 | mass parts | 5 | — |  |  |  |  |  |
|  | Polyamide 1010 | mass parts | — | 5 |  |  |  |  |  |
|  | Polyamide elastomer | mass parts | — | — | — | — | — | — | 3 |
|  | Fine particle | mass % | 0.45 | 0.45 | 0.45 | 0.45 | 0.45 | 0.45 | 0.45 |
|  | Fatty acid amide | mass % | 0.15 | 0.15 | 0.15 | 0.15 | 0.15 | 0.15 | 0.15 |
| MD stretch temperature |  | °C. | 80 | 80 | 80 | 80 | 80 | — | 80 |
| MD stretch ratio |  | — | 3.2 | 3.2 | 3.2 | 3.2 | 3.2 | — | 3.2 |
| TD stretch temperature |  | °C. | 130 | 130 | 130 | 130 | 130 | — | 130 |
| TD stretch ratio |  | — | 4.0 | 4.0 | 4.0 | 4.0 | 4.0 | — | 4.0 |
| TD heat setting temperature |  | °C. | 218 | 218 | 218 | 210 | 218 | — | 210 |
| TD relax temperature |  | °C. | 218 | 218 | 218 | 210 | 218 | — | 210 |
| TD relax ratio |  | % | 7 | 7 | 7 | 7 | 7 | — | 7 |
| Thickness |  | μm | 15 | 15 | 15 | 15 | 15 | 15 | 15 |
| Biomass degree |  | % | 4.6 | 4.5 | 0.0 | 0.0 | 0.5 | 31.5 | 0.0 |
| Haze |  | % | 3.3 | 3.4 | 2.2 | 2.2 | 2.3 | — | 2.3 |
| Impact strength |  | J/15 μm | 1.2 | 1.2 | 0.9 | 1.2 | 0.9 | — | 1.2 |
| Pinhole strength (1° C.) |  | Number | 5 | 6 | 20 | 12 | 18 | — | 3 |
| Friction pinhole strength |  | cm | 3200 | 3300 | 2500 | 3200 | 2600 | — | 2700 |
| Heat shrinkage rate | MD | % | 1.3 | 1.4 | 0.8 | 1.0 | 0.8 | — | 1.1 |
|  | TD | % | 1.5 | 1.5 | 0.8 | 1.1 | 0.9 | — | 1.3 |
| Laminate strength | MD | N/mm | 6.8 | 7.0 | 7.0 | 3.2 | 6.8 | — | 4.3 |
|  | TD | N/mm | 6.7 | 6.9 | 6.9 | 3.3 | 6.6 | — | 4.0 |
| Film formation stability at the time of casting |  | — | Excellent | Excellent | Excellent | Excellent | Excellent | Bad | Excellent |
| Thermal deteriorated product generation cycle |  | Time | — | — | — | — | — | — | 18 |

The film of Examples was excellent in both of folding pinhole resistance and friction pinhole resistance as shown in Table 2. In addition, the film is excellent as a packaging film, since Haze was low, a transparency was good, an impact strength was high and a laminate strength with a sealant film was high.

The biaxially stretched polyamide film of Comparative examples 1-1 and 1-2, which did not contain a material for reformulating folding pinhole resistance, and the biaxially stretched polyamide film of Comparative example 1-3, of which content amount of Polyamide 11 was too small, were inferior in folding pinhole resistance.

A biaxially stretched polyamide film could not be obtained in Comparative example 1-4, since a melted resin could not be stably extruded from a T-die and thereby au uniform unstretched film could not be obtained due to too much content amount of Polyamide 11.

A conventionally used polyamide elastomer was used as a raw material for a reformulation of folding pinhole resistance in Comparative example 1-5; as a result, folding pinhole resistance was good but friction pinhole resistance was inferior. In addition, the film had a disadvantage that a continuous production for a long time was impossible, since a depleted material was easily adhered on a die during a long time production.

Example 2-1

Melted resins were extruded from T-die in a form of a film to be laminated in a constitution of B layer/A layer/B layer by a feed block method using an apparatus consisting of two extruders and coextrusion T-die having a width of 380 mm, and cast to be electrostatically adhered on a cooling roll of which temperature was adjusted to 20° C. by casting to obtain an unstretched film having a thickness of 200 μm.

The resin compositions of the A layer and the B layer are described as follow.

Resin composition of A layer: consisting of 97 mass parts of Polyamide 6 (manufactured by TOYOBO, relative viscosity: 2.8, melting point: 220° C.) and 3.0 mass parts of Polyamide 11 (manufactured by ZIG SHENG INDUSTRIAL CO. LTD., relative viscosity: 2.5, melting point: 186° C.)

Resin composition of B layer: consisting of 95 mass parts of Polyamide 6 (manufactured by TOYOBO, relative viscosity: 2.8, melting point: 220° C.), 5.0 mass parts of Polyamide MXD6 (manufactured by MITSUBISHI GAS CHEMICAL COMPANY, relative viscosity: 2.1, melting point: 237° C.), 0.54 mass parts of porous silica fine particle (manufactured by FUJI SILYSIA CHEMICAL, average particle diameter: 2.0 μm, pore volume: 1.6 mL/g) and 0.15 mass parts of fatty acid bisamide (ethylenebisstearamide, manufactured by Kyoei Kagaku Kogyo)

A constitution of the feed block and a discharge amount of the extruder were adjusted so that the total thickness became 15 μm, the thickness of the base material layer (A layer) became 12 um and the respective thickness of the two surface layers (B layers) became 1.5 μm in the biaxially stretched polyamide film.

The obtained unstretched film was supplied to a roll type stretching machine, and stretched 1.73 times in the MD direction at 80° C. and then further stretched 1.85 times at 70° C. using a difference in circumferential speeds. Subsequently, the uniaxial stretched film was continuously supplied to a tenter type stretching machine and preliminarily heated at 110° C. The film was stretched 1.2 times at 120° C., 1.7 times at 130° C. and 2.0 times at 160° C. in the TD direction and was subjected to a heat setting treatment at 218° C. The film was relaxed by 7% at 218° C., and then the surface to be dry-laminated with a liner low density polyethylene film was subjected to a corona discharge treatment to obtain a biaxially stretched polyamide film. The evaluation result of the obtained biaxially stretched film is shown in Table 2.

Examples 2-2 to 2-11 and Comparative Examples 2-1 to 2-7

Biaxially stretched films were produced by the similar method to Example 2-1 except that a film forming condition such as resin compositions of the A layer and the B layer and a heat setting temperature were changed as Table 3 and Table 4. The evaluation results of the obtained biaxially stretched films are shown in Table 3 and Table 4.

A biaxially stretching was impossible in Comparative examples 2-4, since a melted resin could not be stably extruded from a T-die and thereby au uniform unstretched film could not be obtained.

TABLE 3

| | | | Example | | | | | |
|---|---|---|---|---|---|---|---|---|
| | | | 2-1 | 2-2 | 2-3 | 2-4 | 2-5 | 2-6 |
| Core layer composition | Polyamide 6 | mass parts | 97 | 95 | 90 | 85 | 75 | 95 |
| | Polyamide 11 | mass parts | 3 | 5 | 10 | 15 | 25 | 5 |
| | Polyamide 410 | mass parts | — | — | — | — | — | — |
| | Polyamide 610 | mass parts | — | — | — | — | — | — |
| | Polyamide 1010 | mass parts | — | — | — | — | — | — |
| | Polyamide elastomer | mass parts | — | — | — | — | — | — |
| Skin layer composition | Polyamide 6 | mass parts | 95 | 95 | 97 | 95 | 95 | 90 |
| | Polyamide MXD6 | mass parts | 5 | 5 | 3 | 5 | 5 | 10 |
| | Polyamide elastomer | mass parts | — | — | — | — | — | — |
| | Fine particle | mass % | 0.54 | 0.54 | 0.54 | 0.54 | 0.54 | 0.54 |
| | Fatty acid amide | mass % | 0.15 | 0.15 | 0.15 | 0.15 | 0.15 | 0.15 |
| Total thickness | | pm | 15 | 15 | 15 | 15 | 15 | 15 |
| Core layer thickness | | % | 80 | 80 | 80 | 80 | 80 | 80 |
| Laminated resin constitution | | — | B/A/B | B/A/B | B/A/B | B/A/B | B/A/B | B/A/B |
| MD stretch temperature | | °C. | 80 | 80 | 80 | 80 | 80 | 80 |
| MD stret ratio | | — | 3.2 | 3.2 | 3.2 | 3.2 | 3.2 | 3.2 |
| TD stretch temperature | | °C. | 130 | 130 | 130 | 130 | 130 | 130 |
| TD stretch ratio | | — | 4.0 | 4.0 | 4.0 | 4.0 | 4.0 | 3.8 |
| TD heat setting temperature | | °C. | 218 | 218 | 218 | 218 | 218 | 218 |
| TD relax temperature | | °C. | 218 | 218 | 218 | 218 | 218 | 218 |
| TD relax ratio | | % | 7 | 7 | 7 | 7 | 7 | 7 |
| Haze | | % | 2.4 | 2.7 | 2.8 | 3.1 | 4.7 | 3.0 |
| Dynamic friction coefficient | | — | 0.68 | 0.65 | 0.75 | 0.67 | 0.67 | 0.60 |
| Impact strength | | J/15 μm | 1.11 | 1.34 | 1.00 | 1.36 | 1.10 | 1.22 |
| Biomass degree | | % | 0.5 | 0.9 | 1.8 | 2.7 | 4.5 | 0.9 |
| Pinhole resistance (1° C.) | | Number | 5 | 4 | 4 | 4 | 4 | 3 |
| Abrasion pinhole resistance | | cm | 3300 | 3400 | 3100 | 3200 | 3400 | 3300 |
| Heat shrinkage rate | MD | % | 0.9 | 0.9 | 0.9 | 1.0 | 1.3 | 0.9 |
| | TD | % | 1.0 | 1.0 | 1.1 | 1.2 | 1.3 | 1.0 |
| Laminate strength | MD | N/mm | 7.0 | 6.8 | 7.3 | 7.0 | 6.9 | 7.5 |
| | TD | N/mm | 6.7 | 6.6 | 7.0 | 6.9 | 7.1 | 7.3 |
| Casting stability | | | Excellent | Excellent | Excellent | Excellent | Excellent | Excellent |
| Generation cycle of thermally deteriorated material | | hr | 37 | — | — | — | — | — |

| | | | Example | | | | |
|---|---|---|---|---|---|---|---|
| | | | 2-7 | 2-8 | 2-9 | 2-10 | 2-11 |
| Core layer composition | Polyamide 6 | mass parts | 95 | 95 | 85 | 85 | 85 |
| | Polyamide 11 | mass parts | 5 | 5 | — | — | — |
| | Polyamide 410 | mass parts | — | — | 15 | — | — |
| | Polyamide 610 | mass parts | — | — | — | 15 | — |
| | Polyamide 1010 | mass parts | — | — | — | — | 15 |
| | Polyamide elastomer | mass parts | — | — | — | — | — |
| Skin layer composition | Polyamide 6 | mass parts | 100 | 95 | 95 | 95 | 95 |
| | Polyamide MXD6 | mass parts | — | 5 | 5 | 5 | 5 |
| | Polyamide elastomer | mass parts | — | — | — | — | — |
| | Fine particle | mass % | 0.65 | 0.54 | 0.54 | 0.54 | 0.54 |
| | Fatty acid amide | mass % | 0.20 | 0.15 | 0.15 | 0.15 | 0.15 |
| Total thickness | | pm | 15 | 15 | 15 | 15 | 15 |
| Core layer thickness | | % | 80 | 80 | 80 | 80 | 80 |
| Laminated resin constitution | | — | B/A/B | B/A/B | B/A/B | B/A/B | B/A/B |
| MD stretch temperature | | °C. | 80 | 80 | 80 | 80 | 80 |
| MD stret ratio | | — | 3.2 | 3.0 | 3.2 | 3.2 | 3.2 |
| TD stretch temperature | | °C. | 130 | 130 | 130 | 130 | 130 |
| TD stretch ratio | | — | 3.8 | 3.3 | 4.0 | 4.0 | 4.0 |
| TD heat setting temperature | | °C. | 218 | 210 | 218 | 218 | 218 |
| TD relax temperature | | °C. | 218 | 210 | 218 | 218 | 218 |
| TD relax ratio | | % | 7 | 7 | 7 | 7 | 7 |
| Haze | | % | 3.8 | 2.7 | 3.5 | 3.3 | 3.4 |

TABLE 3-continued

|  |  |  |  |  |  |  |
|---|---|---|---|---|---|---|
| Dynamic friction coefficient | — | 0.80 | 0.65 | 0.65 | 0.66 | 0.65 |
| Impact strength | J/15 μm | 1.21 | 1.40 | 1.20 | 1.19 | 1.21 |
| Biomass degree | % | 0.9 | 0.9 | 2.7 | 2.7 | 2.7 |
| Pinhole resistance (1° C.) | Number | 4 | 4 | 5 | 5 | 6 |
| Abrasion pinhole resistance | cm | 3200 | 3200 | 3500 | 3200 | 3300 |
| Heat shrinkage rate  MD | % | 0.9 | 1.3 | 1.2 | 1.3 | 1.4 |
| TD | % | 1.0 | 1.4 | 1.4 | 1.5 | 1.5 |
| Laminate strength  MD | N/mm | 6.2 | 3.1 | 6.9 | 6.8 | 7.0 |
| TD | N/mm | 6.1 | 3.0 | 6.8 | 6.7 | 6.9 |
| Casting stability |  | Excellent | Excellent | Excellent | Excellent | Excellent |
| Generation cycle of thermally deteriorated material | hr | — | — | — | — | — |

TABLE 4

| | | | Comparative example | | | | | | |
|---|---|---|---|---|---|---|---|---|---|
| | | | 2-1 | 2-2 | 2-3 | 2-4 | 2-5 | 2-6 | 2-7 |
| Core layer composition | Polyamide 6 | mass parts | 100 | 100 | 99.5 | 65 | 95 | 95 | 97 |
| | Polyamide 11 | mass parts | — | — | 0.5 | 35 | 5 | 5 | — |
| | Polyamide 410 | mass parts | — | — | — | — | — | — | — |
| | Polyamide 610 | mass parts | — | — | — | — | — | — | — |
| | Polyamide 1010 | mass parts | — | — | — | — | — | — | — |
| | Polyamide elastomer | mass parts | — | — | — | — | — | — | 3 |
| Skin layer composition | Polyamide 6 | mass parts | 100 | 100 | 95 | 95 | 95 | 65 | 97 |
| | Polyamide MXD6 | mass parts | — | — | 5 | 5 | 5 | 35 | — |
| | Polyamide elastomer | mass parts | — | — | — | — | — | — | 3 |
| | Fine particle | mass % | 0.54 | 0.54 | 0.54 | 0.54 | 0.54 | 0.54 | 0.54 |
| | Fatty acid amide | mass % | 0.15 | 0.15 | 0.15 | 0.15 | 0.15 | 0.15 | 0.15 |
| Total thickness | | μm | 15 | 15 | 15 | 15 | 15 | 15 | 15 |
| Core layer thickness | | % | 80 | 80 | 80 | 80 | 20 | 80 | 80 |
| Laminated resin constitution | | — | B/A/B | B/A/B | B/A/B | B/A/B | B/A/B | B/A/B | B/A/B |
| MD stretch temperature | | ° C. | 80 | 80 | 80 | — | 80 | 80 | 80 |
| MD stretch ratio | | — | 3.2 | 3.2 | 3.2 | — | 3.2 | 3.2 | 3.2 |
| TD stretch temperature | | ° C. | 130 | 130 | 130 | — | 130 | 130 | 130 |
| TD stretch ratio | | — | 4.0 | 4.0 | 4.0 | — | 4.0 | 4.0 | 4.0 |
| TD heat setting temperature | | ° C. | 218 | 210 | 218 | — | 218 | 218 | 210 |
| TD relax temperature | | ° C. | 218 | 210 | 218 | — | 218 | 218 | 210 |
| TD relax ratio | | % | 7 | 7 | 7 | — | 7 | 7 | 7 |
| Haze | | % | 2.2 | 2.3 | 2.3 | — | 3.0 | 3.1 | 2.3 |
| Dynamic friction coefficient | | — | 1.08 | 1.10 | 0.66 | — | 0.67 | 0.61 | 0.76 |
| Impact strength | | J/15 μm | 0.85 | 1.18 | 0.95 | — | 1.20 | 0.80 | 1.20 |
| Biomass degree | | % | 0.0 | 0.0 | 0.1 | — | 21.0 | 20.0 | 3.0 |
| Pinhole resistance (1° C.) | | Number | 23 | 11 | 14 | — | 21 | 20 | 3 |
| Rub pinhole resistance | | cm | 2600 | 3300 | 2700 | — | 3200 | 2900 | 2700 |
| Heat shrinkage rate  MD | | % | 0.8 | 1.3 | 0.7 | — | 1.0 | 0.9 | 1.1 |
| TD | | % | 0.7 | 1.4 | 0.9 | — | 0.9 | 1.0 | 1.3 |
| Laminate strength  MD | | N/mm | 7.0 | 3.3 | 6.8 | — | 6.6 | 6.2 | 4.2 |
| TD | | N/mm | 6.9 | 3.1 | 6.6 | — | 6.5 | 6.3 | 4.0 |
| Casting stability | | | Excellent | Excellent | Excellent | Bad | Excellent | Excellent | Excellent |
| Generation cycle of thermally deteriorated material | | hr | — | — | — | — | — | — | 17 |

The film of Examples was excellent in both of folding pinhole resistance and friction pinhole resistance as shown in Table 3 and Table 4. In addition, the film was excellent as a packaging film, since Haze was low, a transparency was good, an impact strength was high and a laminate strength with a sealant film was high.

The biaxially stretched polyamide film of Comparative examples 2-1 and 2-2, which did not contain a material for reformulating folding pinhole resistance, and the biaxially stretched polyamide film of Comparative example 2-3, of which content amount of Polyamide 11 was too small, were inferior in folding pinhole resistance.

A biaxially stretched polyamide film could not be obtained in Comparative example 2-4, since a melted resin could not be stably extruded from a T-die and thereby au uniform unstretched film could not be obtained due to too much content amount of Polyamide 11.

The folding pinhole resistance of the film was inferior in Comparative example 2-5, since the thickness and the thickness ratio of the A layer was small.

The folding pinhole resistance and the friction pinhole resistance of the film were inferior in Comparative example 2-6, since the amount of Polyamide MXD6 was large and the amount of Polyamide 6 was small in the B layer.

A conventionally used polyamide elastomer was used as a material for a reformulation of folding pinhole resistance in Comparative example 2-7; as a result, folding pinhole resistance was good but friction pinhole resistance was inferior. In addition, the film had a disadvantage that a continuous production for a long time was impossible, since a depleted material was easily adhered on a die during a long time production.

Examples 1-10 and Examples 2-12

The biaxially stretched polyamide films prepared by Example 1-2 and Example 2-2 were used to prepare the laminates having the constitutions of the following (1) to (9), and three-side sealed type and pillow type packaging bags were prepared from the laminates (1) to (9). The packaging bags that had a good appearance and that were hardly broken in a drop impact test could be prepared.

(1) Biaxially stretched polyamide film layer/Printed layer/Polyurethane adhesive layer/Linear low density polyethylene film sealant layer (2) Biaxially stretched polyamide film layer/Printed layer/Polyurethane adhesive layer/Unstretched polypropylene film sealant layer (3) Biaxially stretched PET film layer/Printed layer/Polyurethane adhesive layer/Biaxially stretched polyamide film layer/Polyurethane adhesive layer/Unstretched polypropylene film sealant layer (4) Biaxially stretched PET film layer/Printed layer/Polyurethane adhesive layer/Biaxially stretched polyamide film layer/Polyurethane adhesive layer/Linear low density polyethylene film sealant layer (5) Biaxially stretched polyamide film layer/Anchor coat layer/Inorganic thin film layer/Inorganic thin film protective layer/Printed layer/Polyurethane adhesive layer/Linear low density polyethylene film sealant layer (6) Linear low density polyethylene film sealant layer/Polyurethane adhesive layer/Biaxially stretched polyamide film layer/Anchor coat layer/Inorganic thin film layer/Polyurethane adhesive layer/Linear low density polyethylene film sealant (7) Linear low density polyethylene film layer/Polyurethane adhesive layer/Biaxially stretched polyamide film layer/Anchor coat layer/Inorganic thin film layer/Polyurethane adhesive layer/Linear low density polyethylene film layer/Low density polyethylene/Paper/Low density polyethylene/Linear low density polyethylene film sealant layer (8) Biaxially stretched polyamide film layer/Anchor coat layer/Inorganic thin film layer/Inorganic thin film protective layer/Printed layer/Polyurethane adhesive layer/Unstretched polypropylene film sealant layer (9) Biaxially stretched PET film layer/Inorganic thin film layer/Inorganic thin film protective layer/Printed layer/Polyurethane adhesive layer/Biaxially stretched polyamide film layer/Polyurethane adhesive layer/Easily peeled type unstretched polypropylene film sealant layer

INDUSTRIAL APPLICABILITY

The biaxially stretched polyamide film of the present invention can be preferably used for an application of a packaging material for a food packaging or the like, since the film is excellent in all of impact resistance, folding pinhole resistance and friction pinhole resistance. In addition, the film is prepared from a resin produced by the polymerization of a raw material derived from a biomass inherently on earth; therefore, the film can reduce environmental load, since the film is a carbon-neutral film and has a low impact on the increase and decrease of carbon dioxide on earth.

The invention claimed is:

1. A biaxially stretched polyamide film, comprising
A layer: a base material layer and
B layer: a surface layer,
wherein
the B layer is laminated on at least one surface of the A layer,
the A layer comprises 99 to 70 mass % of a Polyamide 6 resin and 1 to 30 mass % of a polyamide resin, wherein at least a part of a raw material of the polyamide resin is derived from a biomass, and
the B layer comprises 70 mass % or more of a Polyamide 6 resin and 5 to 10 mass % of Polyamide MXD6 resin.

2. The biaxially stretched polyamide film according to claim 1, wherein a content amount of a carbon derived from the biomass to a total carbon in the biaxially stretched polyamide film, measured by a radiocarbon ($C^{14}$) measurement, is 1 to 15%.

3. The biaxially stretched polyamide film according to claim 1, wherein the polyamide resin wherein at least a part of the raw material of the polyamide resin is derived from the biomass is at least one of a polyamide resin selected from the group consisting of Polyamide 11, Polyamide 410, Polyamide 610 and Polyamide 1010.

4. The biaxially stretched polyamide film according to claim 1, wherein the biaxially stretched polyamide film meets the following (a) and (b):
   (a) the number of Gelbo pinhole defect is 10 or less after the biaxially stretched polyamide film is twisted and bent 1000 times at 1° C. using a Gelbo flex tester,
   (b) a distance leading to a pinhole formation by a friction pinhole resistance test is 2900 cm or more.

5. The biaxially stretched polyamide film according to claim 1, wherein Haze is 10% or less and a kinetic friction coefficient is 1.0 or less.

6. The biaxially stretched polyamide film according to claim 1, wherein a laminate strength after the biaxially stretched polyamide film is laminated with a polyethylene sealant film is 4.0 N/15 mm or more.

7. A laminate film, wherein a sealant film is laminated on the biaxially stretched polyamide film according to claim 1.

8. A packaging bag comprising the laminate film according to claim 7.

* * * * *